United States Patent [19]

Herrick

[11] Patent Number: 4,921,299

[45] Date of Patent: May 1, 1990

[54] VEHICLE INTERIOR HEATSHIELD

[76] Inventor: Joseph R. Herrick, 129 St. Rose Dr., Verona, Pa. 15147

[21] Appl. No.: 305,777

[22] Filed: Feb. 3, 1989

[51] Int. Cl.$^5$ ............................................... B60J 3/02
[52] U.S. Cl. .................................. 296/978; 296/97.11; 160/370.2; 160/271
[58] Field of Search .................... 296/97.1, 97.2, 97.7, 296/97.8, 97.11; 160/370.2, 270, 271, 241, 120, 23.1

[56] References Cited

U.S. PATENT DOCUMENTS

| | | | |
|---|---|---|---|
| 1,735,699 | 12/1928 | Shelton | 160/370.2 |
| 2,082,405 | 5/1936 | Lloyd et al. | 160/271 |
| 4,161,336 | 7/1974 | LeVan et al. | 296/218 |
| 4,560,245 | 12/1985 | Sarver | 296/97.8 |
| 4,775,180 | 10/1988 | Phillips | 296/97.7 |
| 4,818,011 | 4/1989 | Cherian | 296/47.8 |
| 4,823,859 | 4/1989 | Park | 296/97.8 |

FOREIGN PATENT DOCUMENTS

| | | | |
|---|---|---|---|
| 2806986 | 8/1974 | Fed. Rep. of Germany | 296/97.8 |
| 0490031 | 7/1955 | Italy | 296/97.8 |
| 0238021 | 8/1925 | United Kingdom | 296/97.8 |

Primary Examiner—Dennis H. Pedder
Attorney, Agent, or Firm—Richard C. Litman

[57] ABSTRACT

A heatshield and sunshield for placement within windows or windshields may be coiled within a permanently installed cylindrical container for storage. The container includes a spring in order to bias the shield in the retracted position. Tracks are installed for the upper and lower edges of the shield in order to maintain a precise distance between the shield and the glass. Preferably two storage containers are installed at opposite sides of the glass or window which the shields are to cover, in order that the shields may be extended from each container and joined to each other near the center of the glass or window. The shields are preferably coated with an aluminized or highly reflective coating on their outer surfaces and are preferably formed of a material of relatively high thermal insulating properties. In one embodiment, spacer blocks are used to position the tracks a precise distance from the surfaces to which they are attached in order to allow a positive circulation of air between shields and glass using the thermal siphon effect.

6 Claims, 2 Drawing Sheets

VEHICLE INTERIOR HEATSHIELD

FIELD OF THE INVENTION

This invention relates generally to shades and like protective devices for vehicle interiors, and more specifically to a shield for the prevention of heat buildup in a vehicle interior.

BACKGROUND OF THE INVENTION

A continuing problem with enclosed vehicles is the heat generated by solar energy penetrating to the interior of the vehicle. Depending upon variables such as the season of the year, cloud cover, etc., a vehicle interior may reach temperatures of over 150 degrees Fahrenheit when all windows are up and the vehicle is locked or secured.

The cause of such heat buildup is the well known "greenhouse effect." This effect is due to the fact that standard glass as used in most vehicle windows is transparent to only a limited range of frequencies of electromagnetic energy. Although glass may be transparent to many higher frequencies of solar radiation, this radiation tends to be absorbed by the various interior components of the vehicle, whereupon the radiation energy is re-emitted as lower frequency and energy radiation primarily in the infrared portion of the spectrum. Standard glass is somewhat opaque to such infrared frequencies, and allows only a limited amount of such energy to pass through the glass to the vehicle exterior. Hence, although almost all of the solar energy received by the glass is allowed to pass through, only a fraction of that energy escapes back through the glass. The net energy input to the interior of the vehicle causes the buildup of heat. As newer vehicles, particularly automobiles, have been developed, this problem has become even more serious due to increases in glass area, better insulation which tends to prevent the re-radiation of the heat buildup, and more tightly fitting door, window, and body seals.

What is needed is a device capable of reducing the amount of solar energy penetrating to the vehicle interior, and of controlling the flow of heated air within the vehicle interior when the vehicle is parked and secured. The device must be capable of permanent installation in the vehicle for convenience, and yet easily storable in a permanently installed, compact container.

DESCRIPTION OF THE RELATED ART

Various types of protective shades for automobile interiors are well known. An example is Eubanks U.S. Pat. No. 4,736,980, which discloses a reel mounted shade which may be unreeled to extend horizontally across the windshield of a vehicle. As the shade is contained within a single reel, it may suffer from clearance problems relative to a windshield mounted rearview mirror as it is extended completely across the windshield. Moreover, the volume of air contained between the curvature of the windshield and the shade is relatively large, permitting a great deal of heat to be generated within that volume.

Jacobi U.S. Pat. No. 2,726,114 is of a similar principle, but the shade is of a semitransparent nature and covers only a portion of the windshield at any given time. This device is intended to reduce glare while driving, rather than to prevent heat buildup while the vehicle is parked.

Other similar devices for the reduction of glare are known which operate on the roller or reel principle, such as Labeur U.S. Pat. No. 4,758,041 and Hodgson et al. U.S. Pat. No. 3,363,666. While these devices would be somewhat serviceable in the manner of the present invention if equipped with opaque, reflective shades, they are much more complex than the present invention as they are intended to be remotely operable while the vehicle is in motion. The also make no provision for precisely controlling the space between the shade and the vehicle windshield or glass, as does the present invention.

SUMMARY OF THE INVENTION

By the present invention, an improved device for the prevention of heat buildup in the interior of vehicles, boats, and aircraft, or the like, while such vehicles are parked and secured is presented.

Accordingly, one of the objects of the present invention is to provide a device which may be quickly and easily deployed from a permanently installed reel or container.

Another object of the present invention is to provide a device which may be installed after the vehicle is constructed, or incorporated within the vehicle structure during construction.

Yet another object of the present invention is to provide a device half of which may be extended from each side of the vehicle windshield and connected with its mating half in the windshield center, so as to provide clearance from any mirror or other object attached to the windshield center.

Still another object of the present invention is to provide a device which allows a precise air space between the vehicle windshield and the shade for optimum effect.

A further object of the present invention is to provide a device which allows a precise gap at the top and/or bottom of the shade in order to precisely control the flow of air between the windshield and shade.

An additional object of the present invention is to provide a device which is widely adaptable to a variety of windshield and/or window configurations in various vehicle types, such as automobiles, boats, aircraft, and the like.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
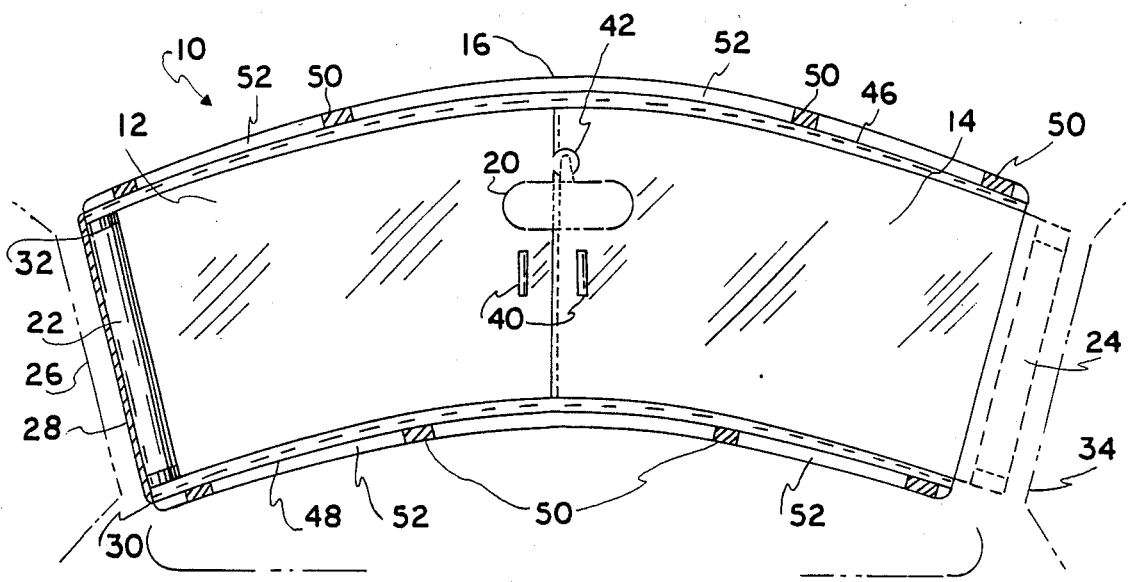
FIG. 1 is a front elevation showing the interior of a vehicle windshield with the heatshield installed.

Referring now to the drawings, the present invention will be understood to relate to a heatshield for the prevention of heat buildup within the enclosed interior of a vehicle. Heatshield 10 is best shown in FIG. 1. In this figure, left shield 12 and right shield 14 are shown deployed to their fully closed position, in which left shield 12 and right shield 14 are connected at the approximate center 16 of the windshield 18, shown more clearly in FIGS. 2A, 2B, and 3, near mirror 20.

Shield halves 12 and 14 are preferably formed of a relatively thin, flexible material incorporating an aluminized or highly reflective suface 13 on one side. Halves 12 and 14 are preferably installed with the reflective surface outward when in use, toward the inner surface of windshield 18 in order to reflect as much incoming solar energy as possible. The efficiency of halves 12 and 14 may be further improved by forming them of a thermal insulating material, insofar as storage space may provide for the thickness of such material.

Left half 12 and right half 14 of shield 10 are contained respectively within cylindrical reels 22 and 24 when in their retracted state. In FIG. 1 left cylindrical reel 22 is shown attached to the surface of left windshield post 26 adjacent to the left edge of windshield 18. Reel 22 thus may be added to the vehicle after manufacture and may be attached by means of adhesive component 28 or alternative means, not shown, such as mechanical fasteners, or the like. By forming adhesive component 28 as a continuous strip which extends from lower end 30 to upper end 32 of left reel 22, an advantage may be gained whereby the air space between windshield 18 and shield halves 12 and 14 may be prevented from circulating and mixing with the air within the remainder of the interior of the vehicle. This advantage will be described in greater detail below.

The right shield half 14 may be contained in a like manner to that of left shield half 12. In this embodiment, right reel 24 is shown contained within right windshield post 34 rather than secured to the surface of such post 34. Such an installation may be more conveniently performed during manufacture of the vehicle, and generally the two means shown for installing left reel 22 and right reel 24 would not normally be performed on the same vehicle.

Functionally, right reel 24 operates identically to left reel 22. Coiled springs, not shown, within left and right reels 22 and 24 tend to produce a constant retractive force upon left and right shield halves 12 and 14, respectively, in the manner of the well known vertically oriented window shade. Reels 22 and 24, however, are less complex in that they do not contain a locking means to allow shield halves 12 and 14 to be retained at some intermediate position. Therefore, unless halves 12 and 14 are latched or connected together they will automatically retract into their respective reels 22 and 24, thereby clearing vehicle windshield 18 or other windows in order to allow the operation of the vehicle.

Figure 2A:
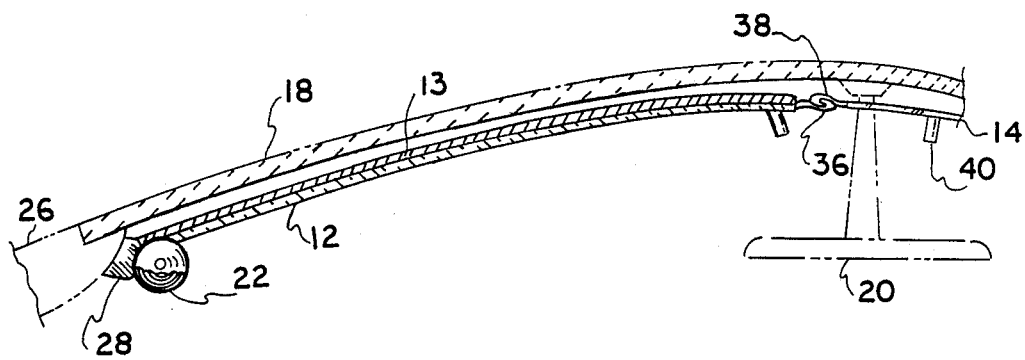
FIG. 2A is a top view in section of a vehicle windshield with the heatshield installed, showing details of the heatshield.

Shield halves 12 and 14 may be connected by means of interlocking curved portions 36 and 38 respectively, shown more clearly in FIG. 2A. By grasping handles 40 adjacent to portions 36 and 38 of shield halves 12 and 14, the shield halves 12 and 14 may be withdrawn from reels 22 and 24 respectively and interconnected using interlocking curved portions 36 and 38. Preferably such portions 36 and 38 encompass the full vertical extent of halves 12 and 14 so as to provide a seal between halves 12 and 14 as well as an interconnecting means.

Figure 2B:
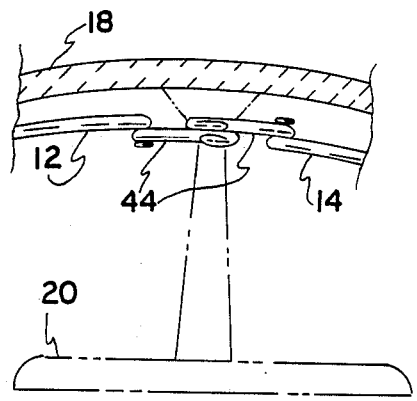
FIG. 2B is a top view in section of an alternative method of connecting the heatshield halves.

As many vehicles contain rear view mirrors secured to the inner surface of the windshield itself, means must be provided for clearance from such a mirror. A slot 42 may be formed in portion 36 and/or 38 of one or both of shield halves 12 and 14 in order to provide a clearance for such a mirror attachment bracket. Alternatively, hooks 44 may be provided on each shield half 12 and 14 in order to secure halves 12 and 14 to the attachment bracket of mirror 20, or to each other, as shown in FIG. 2B.

Figure 3:
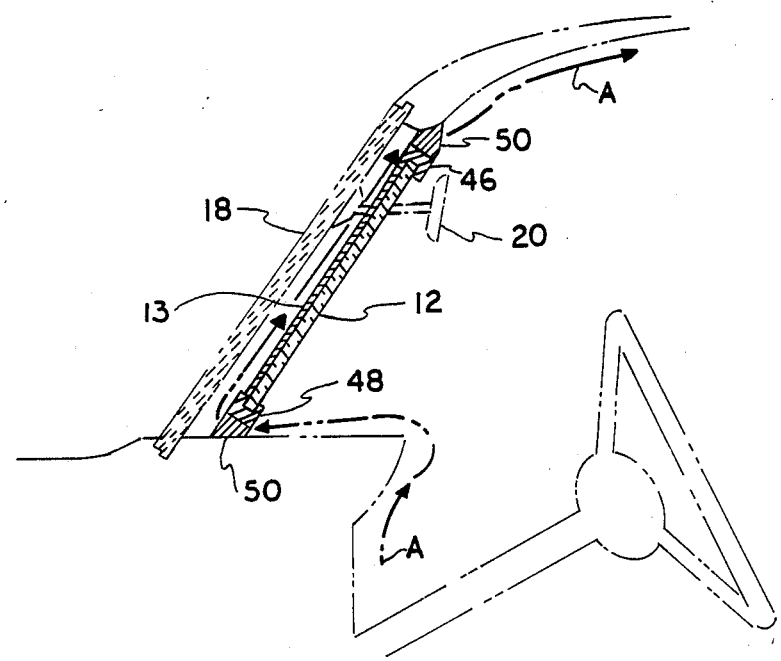
FIG. 3 is a side elevation in section of a vehicle windshield with the heatshield installed, showing further details of the shield and its installation.

It is desireable to allow as little as possible of the volume of air contained within a vehicle to be heated by the greenhouse effect. The smaller the volume of air retained between heatshield 10 and glass 18, the lower the average temperature of the total volume of air contained within the vehicle will be. As most vehicles contain curved windshield and other glass areas, means to retain heatshield 10 as closely as possible to glass 18 are provided in the form of upper track 46 and lower track 48 of FIG. 1. Guide tracks 46 and 48 consist of channels of generally "C" shape, as shown in FIG. 3, in order to properly retain the upper and lower edges of shield halves 12 and 14. Tracks 46 and 48 may be formed as desired in order to closely conform with the curvature of the upper and lower edges of glass 18, thereby reducing the distance between glass 18 and heatshield 10.

Tracks 46 and 48 are adhesively or mechanically installed adjacent to the upper and lower edges of glass 18 by means of spacers 50 as shown in FIGS. 1 and 3. By placing spacers 50 between tracks 46 and 48 and the surface upon which they are installed, a space 52 is provided for air circulation as shown in FIG. 3. Alternatively spacers 50 may be eliminated or the air gap 52 blocked in order to eliminated such air circulation as desired.

When a vehicle is parked in the sun and completely enclosed and secured, the interior temperature will rise to a point well above that of the exterior environment due to the greenhouse effect. Shield 10 enables the vehicle operator to prevent much of this interior heat buildup by extending shield halves 12 and 14 from their respective reels 22 and 24 and connecting them together by means of interlocking portions 36 and 38 or hooks 44. Such heat shields 10 may be installed within all glass areas of a vehicle in order to provide optimum effect. However, the greatest amount of interior heat buildup is due to those glass areas which are inclined or sloped to the greatest degree, such as the front windshield and rear window glass of an automobile.

When shield halves 12 and 14 are extended and connected, the radiant solar energy penetrating glass 18 will tend to be reflected by the aluminized or reflecting surfaces of shield halves 12 and 14. Some of the incoming radiation will be absorbed by shield halves 12 and 14 and re - radiated as heat. As standard glass is somewhat opaque to energy in this spectrum, the heat will tend to be trapped between shield halves 12 and 14 and glass 18, causing any air between to be heated but preventing the air in the remainder of the vehicle interior from becoming heated to such an extent.

If a vehicle is to be secured for only some few hours, air gaps 52 adjacent to upper and lower tracks 46 and 48 respectively become effective. As the air between shield halves 12 and 14 and glass 18 becomes heated, in will tend to expand and rise. This heated air may then flow into the interior of the vehicle through the air gap adjacent to upper track 46, indicated by arrows A, and will be replaced by cooler air entering the space by way of the air gap adjacent to lower track 48. Thus, a "thermal siphon" effect is created which provides some circulation of the air within the vehicle interior. The circulation is dependent upon several variables, such as the volume of air within the vehicle interior, the window area of the vehicle, etc. The size of air gaps 52 and spacing between shield halves 12 and 14 and glass 18 may be adjusted accordingly during installation for optimum effect.

Alternatively, if the vehicle is to be left in the sun for a prolonged period of time such air gaps may allow the thermal siphon effect to eventually equalize the temperatures within the upper portion of the vehicle interior and the airspace between shield halves 12 and 14 and windshield 18. In such a situation, it may prove advantageous to block any possible airflow at either or both gaps 52 in order to prevent the mixing of air from the space between shield halves 12 and 14 and glass 18. In this situation the temperature of the airspace between shield halves 12 and 14 and glass 18 will rise to a point much higher than that of the remainder of the vehicle interior, but as this heated air space contains such a small volume the average temperature of the vehicle interior will be maintained at a relatively low level, even as the air between shield halves 12 and 14 and windshield 18 and the air within the rest of the vehicle becomes mixed following the retraction of shield halves 12 and 14 for vehicle operation.

It is to be understood that the present invention is ot limited to the sole embodiment described above, but encompasses any and all embodiments within the scope of the following claims.

I claim:

1. A heatshield and sunshield for vehicle windows, comprising:
    at least one thin, flexible, opaque shield component,
    at least one cylindrical container, wherein said at least one shield component may be retracted and coiled for storage,
    biasing means retracting said at least one shield component within said at least one cylindrical container,
    upper and lower guide track components containing respective upper and lower edges of said at least one shield component when said at least one shield component is extended, and
    spacing means positioning said guide components from adjacent structure, thereby allowing air flow between said guide components and said structure.
2. The heatshield and sunshield of claim 1, including; two separate shield components,
    cooperating attaching means disposed on adjacent shield component edges to attach said adjacent edges together.
3. The heatshield and sunshield of claim 1, wherein; said at least one shield component includes a thermal insulating material.
4. The heatshield and sunshield of claim 1, wherein; said at least one container has means to install said container within the structural periphery of said vehicle windows.
5. The heatshield and sunshield of claim 2, wherein; said cooperating attaching means comprise hooked fasteners.
6. The heatshield and sunshield of claim 1, including; an outer surface comprising a highly reflective coating.

* * * * *